May 16, 1961   F. R. BORKMANN   2,984,289
TAPE APPLYING APPARATUS
Filed April 21, 1958   4 Sheets-Sheet 1
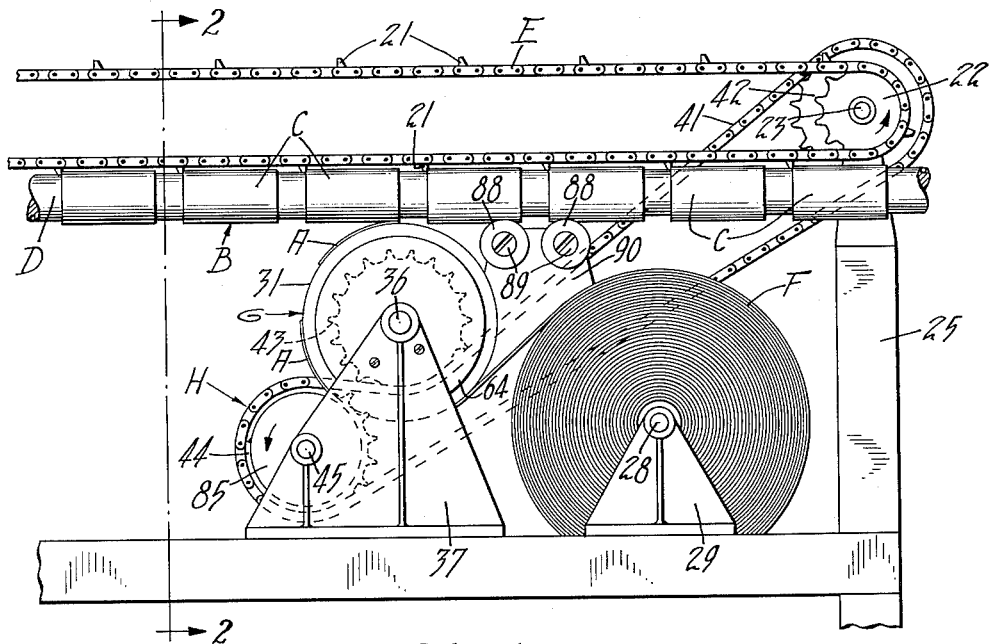
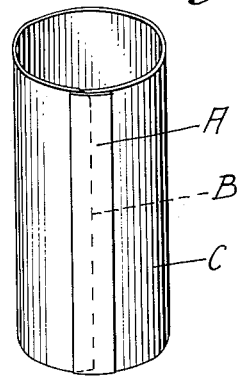
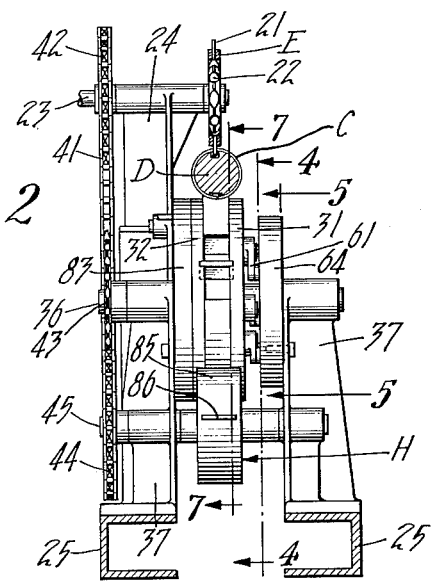
INVENTOR.
FRANK F. BORKMANN
BY Leland R. McCann
George W. Reiber
ATTORNEYS

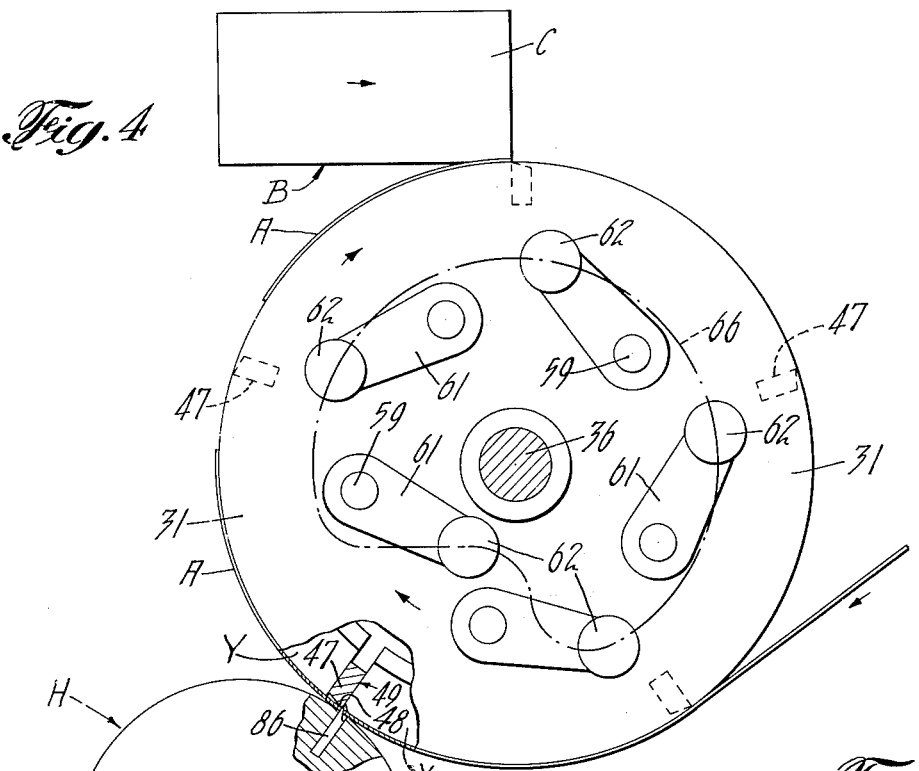
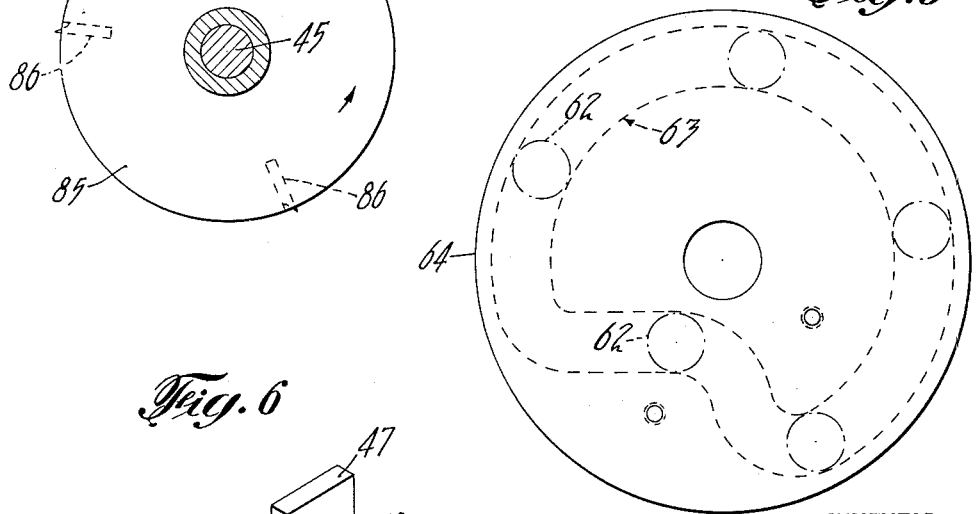
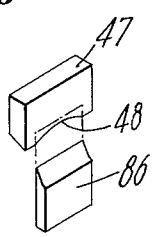

May 16, 1961

F. R. BORKMANN 2,984,289

TAPE APPLYING APPARATUS

Filed April 21, 1958

INVENTOR.
FRANK F. BORKMANN
BY Leland R. McCann
George W. Reiber
ATTORNEYS

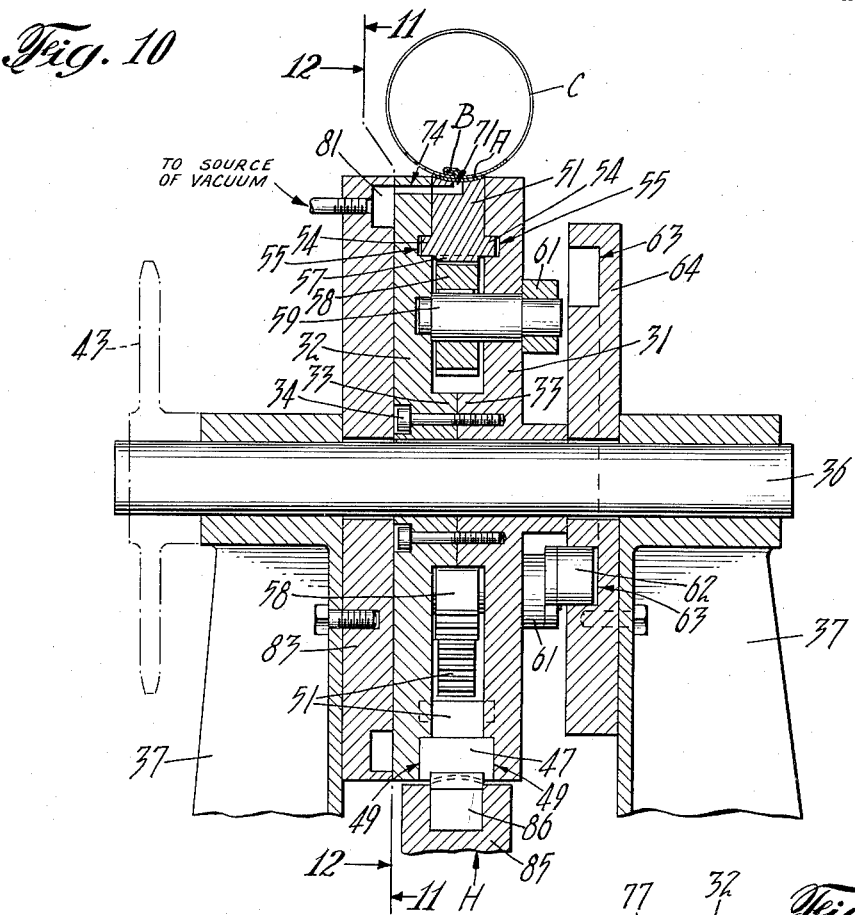
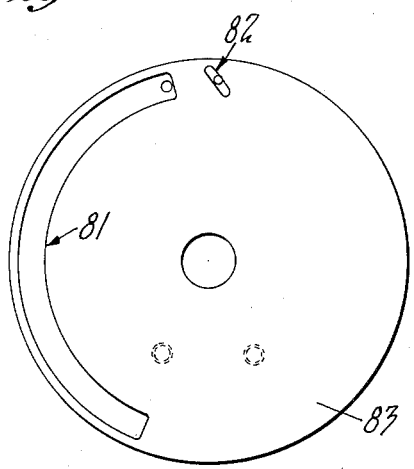
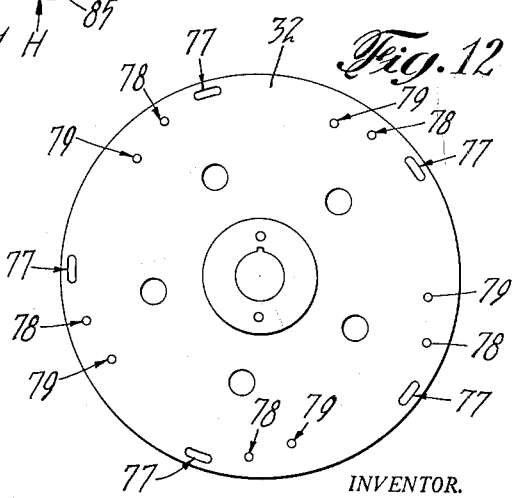

United States Patent Office 2,984,289
Patented May 16, 1961

2,984,289

TAPE APPLYING APPARATUS

Frank R. Borkmann, Union, N.J., assignor to American Can Company, New York, N.Y., a corporation of New Jersey Filed Apr. 21, 1958, Ser. No. 729,697

10 Claims. (Cl. 154—42.3)

The present invention relates to apparatus for applying tape to the side seam of a can body and has particular reference to locating the tape in a predetermined position on the body.

An object of the invention is the provision of an apparatus for applying a free predetermined length of tape to a can body, longitudinally thereof and in a predetermined location relative to the length of the body.

Another object is to provide for accuracy in applying the tape longitudinally of an individual can body so as to compensate for the spaces between a plurality of such bodies advancing in spaced processional order along a path of travel.

Another object is to provide for the cutting off of a predetermined length of tape from a substantially continuous reel of such tape and for the applying of the cut-off length to the can body in a predetermined location.

Numerous other objects and advantages of the invention will be apparent as it is better understood from the following description, which, taken in connection with the accompanying drawings, discloses a preferred embodiment thereof.

Referring to the drawings:

Fig. 1 is a side elevation of an apparatus embodying the instant invention, with parts broken away;

Fig. 2 is a transverse sectional view as taken substantially along the line 2—2 in Fig. 1;

Fig. 3 is an enlarged perspective view of a can body with a tape applied to its side seam by the instant apparatus invention;

Fig. 4 is an enlarged sectional view as taken substantially along the line 4—4 in Fig. 2, with parts broken away;

Fig. 5 is an enlarged side view of a cam as viewed along the line 5—5 in Fig. 2;

Fig. 6 is an enlarged perspective view of a set of tape cutters shown in Fig. 4;

Figure 7:
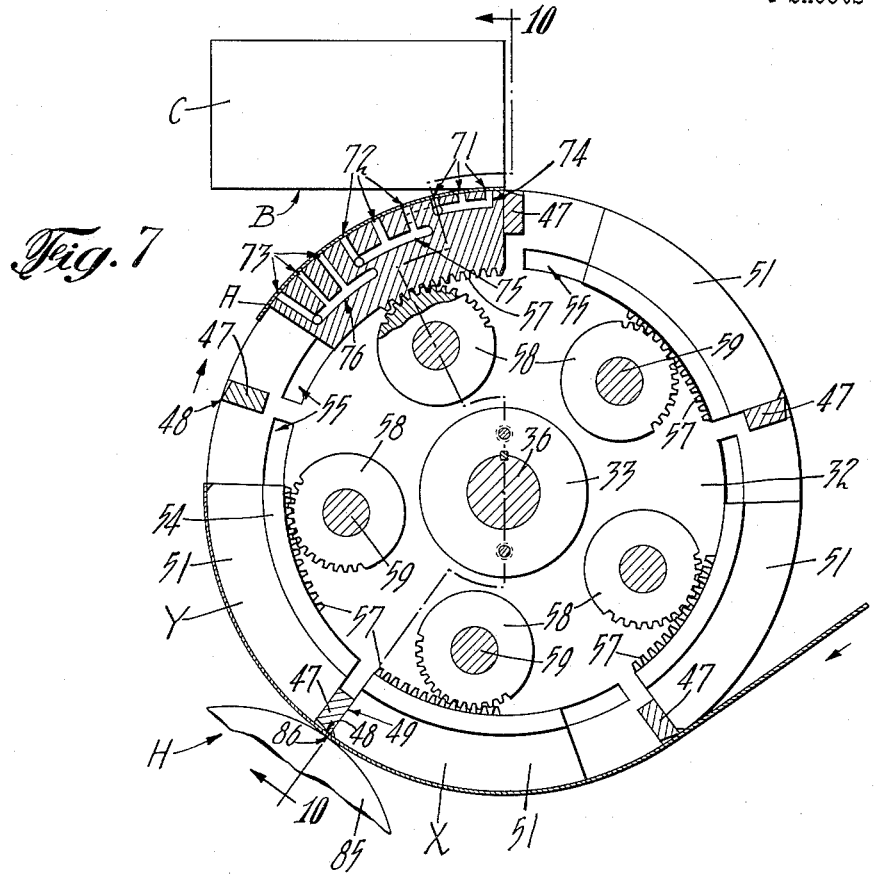
Fig. 7 is an enlarged sectional view taken substantially along the line 7—7 in Fig. 2.

Fig. 10 is a transverse sectional view taken substantially along the broken line 10—10 in Fig. 7, with parts broken away; and Figs. 11 and 12 are face views of parts of a valve mechanism as taken substantially along the lines 11—11, 12—12 in Fig. 10.

As a preferred or exemplary embodiment of the instant invention the drawings illustrate an apparatus for applying predetermined lengths of tape A (Fig. 3), of any preferable substantially solid, preformed, suitable material, to the outer faces of the side seam B of a tubular can body C made of fibre or metal can body material, preferably tin plate or black iron.

In the apparatus a plurality of can bodies C are advanced along a path of travel in spaced and timed, end-to-end processional order, with their side seams B arranged in longitudinally aligned relation. The bodies C preferably are supported on a horn or mandrel D (Fig. 1) and are propelled along the horn by a conveyor E. During this advancement of a can body C along the horn D, a length of tape A is accurately cut from a reel F of such tape and is carried toward the advancing body and is shifted into a predetermined location relative to the body prior to its application to the side seam to effect an accurately located application of the tape to the body and thereby compensate for the spaces between the moving bodies. This is effected by an applicator mechanism G (Fig. 1).

The horn D preferably is a supported extension of the horn of a more elaborate machine such as a can bodymaker of the type illustrated in United States Patent 1,770,011, issued July 8, 1930 to J. F. Peters on Roll Bodymaker or United States Patent 1,773,892 issued August 26, 1930 to J. A. Toleik on Electric Welding, although the horn could readily be a part of any other suitable type machine.

The conveyor E preferably is an endless chain conveyor disposed above the horn D with the lower run of the chain extending along and close to the top of the horn as best shown in Fig. 1. This conveyor E, at spaced intervals along its length, carries feed dogs 21, which engage behind and propel the can bodies C along the horn in properly spaced relation. The conveyor operates over spaced sprockets 22 (one of which is shown in Fig. 1) carried on suitable shafts 23 mounted in bearing brackets 24 (Fig. 2) supported on a frame 25 which preferably is a part of the bodymaker or other machine. The shaft 23 shown in Figs. 1 and 2 is the driving shaft and is rotated continuously in any suitable manner so as to effect continuous uniform advancement of the spaced can bodies C along the horn D.

The reel of tape F, preferably is located below the horn D, adjacent the path of travel of the aligned side seams B of the can bodies C, and is freely mounted on a support shaft 28 (Fig. 1) carried in a pair of spaced brackets 29 on the machine frame 25. The tape extends from the reel F to the applicator mechanism G as best shown in Fig. 1.

The applicator mechanism G preferably comprises a pair of spaced and parallel discs 31, 32 (Figs. 2 and 10) having inwardly extending hubs 33 which are secured together by bolts 34 to provide a unitary rotatable structure. The disc structure is located below the horn D in substantially tangential relation to the path of travel of the side seams B of the can bodies C advancing along the horn, as shown in Figs. 1, 2, 4 and 10. The two discs 31, 32 are mounted on and are keyed to a drive shaft 36 which is journaled in bearing brackets 37 carried on the machine frame 25.

The locked together discs 31, 32 are rotated continuously as a unitary structure, in time with and in the same direction of travel and lineal speed, as the can bodies C advanced along the horn D by the conveyor F. This timed rotation of the discs is effected by an endless chain 41 (Figs. 1 and 2) which is driven by a drive sprocket 42 mounted on the conveyor drive shaft 23. The chain 41 operates against an applicator drive sprocket 43 carried on the disc drive shaft 36 and over an idler sprocket 44 mounted on an idler shaft 45 journaled in the bearing brackets 37.

In the space between the discs 31, 32, the discs carry a plurality of stationary or fixed tape cut-off blades or knives 47 (Figs. 6, 7 and 10) which are radially disposed and which bridge across the space between the two discs. The drawings show five of these cut-off blades spaced equally around the outer periphery of the discs with their sharp cutting edge 48 substantially flush with the peripheries of the discs. These blades 47 are secured in radial slots 49 (Fig. 10) formed in the inner faces of the discs.

Figure 8:
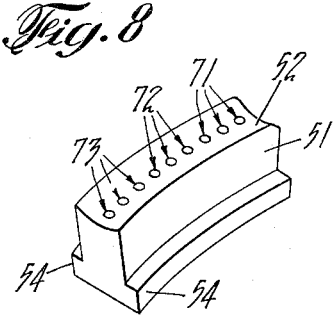
Fig. 8 is a perspective view of one of the applicator elements shown in Fig. 7.
Figure 9:
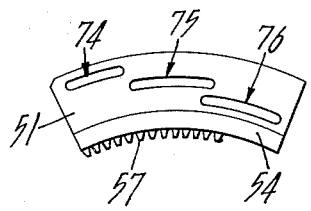
Fig. 9 is an elevational view of the reverse side of the applicator element shown in Fig. 8.

Likewise, in the space between the discs 31, 32 and between the cut-off blades 47, the discs carry a plurality of applicator elements or segments 51 (Figs. 7, 8, 9 and 10) disposed adjacent the outer periphery of the discs and having longitudinally curved outer faces 52 which coincide with the outer periphery of the discs. These faces 52 are also transversely curved to match the curved contour of the can bodies C (as best shown in Fig. 8). These segments 51 receive the tape A from the reel F and carry it forward to the side seam A of a can body C as will be hereinafter explained.

There is one segment 51 in each space between each two cut-off blades 47. Therefore, for five cut-off blades there are five segments 51. Each segment 51 is shorter than the length of its space for circumferential travel or shifting between the two space defining cut-off blades (see Fig. 7). For this purpose, the segments 51 are provided with laterally extending curved flanges 54 which are slidably mounted in curved guide grooves 55 formed in the inner faces of the two discs 31, 32.

The applicator segments 51 are shifted backward and forward in their spaces between consecutive cut-off blades 47 by cam action. For this purpose, the inner face of each segment 51 is provided with rack teeth 57 (Figs. 7, 9 and 10) which mesh with a rotatable segment gear 58 mounted on a short pin 59 journaled in the discs 31, 32 (see Fig. 10). There is one segment gear 58 for each segment 51. The pins 59 on which the segment gears 58 are mounted, project through the disc 31 and adjacent the outer face of the disc 31, carry cam arms 61 (see also Fig. 4) having cam rollers 62 which operate in a common cam groove 63 in a stationary cam 64 (Figs. 5 and 10). The cam 64 surrounds the disc shaft 36, adjacent the outer face of the disc 31, and is secured to the adjacent bearing bracket 37.

Thus as the discs 31, 32 rotate and carry the applicator segments 51 around a circular path of travel, toward and away from the horn D, the cam rollers 62 traverse the cam groove 63, following a path of travel 66 as shown in Fig. 4, to swing the cam arms 61 and thus rock the segment gears 58. This rocking of the gears 58 shifts each of the segments 51, at the proper time into position to receive the tape A, and then to shift the segment backward into position for the cutting off of a predetermined length of the tape and then to shift the segment forward into position for applying the free length of tape to a can body B.

The continuous tape A from the reel F as best shown in Fig. 1, travels from the reel, downwardly under the applicator mechanism G where it is received by the segments 51 as each segment approaches the bottom of the mechanism. The normal position of each applicator segment 51 is shown at the right in Fig. 7 where the leading end of the segment is abutted against the relatively leading cut-off blade 47 for this segment. The segment remains in this relation as the rotating discs 31, 32 carry it downwardly toward and under the bottom of the mechanism.

As a segment 51 rotates along the bottom of the mechanism it causes the tape to cling to it by way of a vacuum which is progressively created at and along the outer face 52 of the segment. For this purpose the outer face 52 of each segment 51 is provided with a plurality of ports 71, 72, 73 (Figs. 7 and 8) arranged in groups for progressive vacuumization. These ports 71, 72, 73 communicate with respective channels 74, 75, 76 (Figs. 7 and 9) formed in one side of the segments. The channels 74, 75, 76, in the normal position of the segments 51 as defined above, respectively align with ports 77, 78, 79 (Figs. 10 and 12) in the disc 32. These ports 77, 78, 79 in turn and at the proper time rotate with the disc 32 into communication with an arcuate groove 81 and a vent outlet 82 in a stationary valve member 83 (see Figs. 10 and 11) which is disposed in sealing engagement against the outer face of the disc 32. The valve member 83 surrounds the applicator shaft 36 and is secured to the adjacent bearing bracket 37. The groove 81 extends substantially half way around the valve member from the bottom of the applicator mechanism toward the top (at the left as shown in Fig. 11) and terminates adjacent the horn D. This groove 81 is connected to any suitable source of vacuum which keeps the groove vacuumized constantly. The vent outlet 82 is disposed immediately adjacent the terminal end of the groove 81 and is connected to the outside atmosphere.

Hence, as a segment 51 rotates under the bottom of the applicator mechanism and starts up toward the horn D, i.e., through the position X shown in Figs. 4 and 7, the leading vacuum ports 71 in the segment move into communication with the vacuum groove 81 and thereby set up a vacuum on the tape which holds the tape against the face 52 of the segment. As the segment advances with the discs 31, 32 the other ports 72, 73 move into position to cause the tape to be held by vacuum along the entire length of the segment.

While the discs 31, 32 continue to carry the segment 51 and its clinging tape, upwardly toward the horn D, and before the next following segment 51 is rotated into communication with the vacuum groove 81, the first segment 51 is shifted backward by a retarding or rocking action of its cam arm 61, so that the trailing end of the segment abuts against its trailing cut-off blade 47; the segment assuming a position Y as shown in Figs. 4 and 7. In this new position of the first segment 51 it will be observed that the trailing end of the first segment is abutted against the leading face of its trailing cut-off blade 47 and at the same time the leading end of the next following segment 51 is abutted against the trailing face of the same cut-off blade 47. At this time in the cycle of operation the following segment 51 is vacuumized to hold the tape against its outer face also.

While the two segments 51 are thus adjacently disposed against the same cut-off blade 47, the tape is cut through along the trailing face of the blade to sever a free length of tape and leave it clinging to the first or leading segment 51. This severing action is effected by a cut-off device H (Figs. 1, 2 and 4) which preferably comprises a rotating wheel 85 mounted on the idler sprocket shaft 45 and disposed in substantially tangential relation to the circular path of travel of the segments 51 on the discs 31, 32. On its outer periphery, the cut-off wheel carries a plurality of radially projecting auxiliary cut-off blades 86 (see also Fig. 6) which through the timed rotation of the wheel in relation to the rotation of the discs 31, 32, cooperate with the cut-off blades 47 to sever the tape into its free lengths. Each segment 51 receives and carries one free, cut-off predetermined length of tape A.

As soon as the length of tape A has been severed from the continuous strand of tape and while the discs 31, 32 continue to rotate, the segment 51 (at the right of the cut-off position as viewed in Fig. 7) that holds the terminal end of the continuous strand of tape, is shifted backward through a retarding action such as explained above, until its trailing end abuts against the leading face of its trailing cut-off blade 47; i.e., the next following cut-off blade 47. This backward movement is effected through the stationary cam 64 and the rocking of the cam arm 61 associated with this particular segment 51. Thus the terminal end portion of the continuous strand of tape is relocated in proper position relative to the next in line cut-off blade 47 for the next tape severing operation when this blade 47 rotates with the discs 31, 32 into position adjacent the cut-off wheel 85. It is this shifting action of the segment 51 that determines the length of tape to be cut off.

While the above action is taking place, the leading or first segment 51 that carries the free or cut-off length of tape A, is shifted forward in an accelerating action, effected through the cam 64, to move the segment away from the cut-off blade 47 at the cut-off position as shown in Fig. 7 and to advance it into a position where its leading end abuts against the trailing face of the forward cut-off blade 47. This shifting of the forward segment 51 is completely finished before it reaches the region of the horn D so that upon reaching the horn, the segment 51, its forward cut-off blade 47, and the discs 31, 32 are rotating as a unitary structure in time with and in register with a can body C advancing along the horn.

Hence, as the leading end of the segment 51 rotates into register with the leading end of the can body C, the free length of tape A on the segment is interposed between the segment and the side seam B of the can body, and with continued advancement of the body and the segment, the segment rolls against and along the body side seam and thus lays and presses the tape A into position against the seam. During this tape applying action, the vacuum ports 71, 72, 73 in the segment face 52 are progressively cut off from communication with the vacuum groove 81 by advancement beyond the terminal end of the groove and are moved into communication with the vent outlet 82 (see Fig. 11) so as to progressively break the vacuum and thus release the free length of tape A from the segment. The tape A is thus progressively transferred from the segment to the can body side seam as the body and the segment roll together past the point of tangency of the horn D and the discs 31, 32. The tape A preferably is provided with a pressure sensitive coating to effect declinging of the tape to the body.

As shown in the drawings, the free length of the tape A preferably is equal to the length of the can body so that the tape will be applied to the full length of the body. Also the timing of the register of the segment 51 with the can body preferably is such as to locate the leading end of the tape precisely at the leading edge of the body to insure no overhanging portion of the tape at the trailing edge of the body. However the length of the tape applied to the body may be varied in accordance to its desired position on the can body in case it is desired to apply a shorter length than the full length of the body and to effect its location anywhere along the length of the body. In thus applying the tape A in this manner the spaces required between the ends of the bodies moving in spaced processional order, are readily compensated for.

In order to insure that the applied tape A fits close to the body, the instant machine provides for the immediate advancement of the can body and its applied tape, over one or more pressure rollers 88 (Fig. 1) which press the tape tightly against the body as the body advances over them. There are preferably two of these rollers 88 and they are close to the horn D in the path of travel of the side seams of the bodies. These rollers preferably are idle rollers mounted on stub shafts 89 secured in an upright web portion 90 of one of the bearing brackets 37.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for applying tape to the side seam of tubular can bodies, comprising means for advancing a can body along a path of travel, a pair of laterally spaced and parallel rotatable discs disposed adjacent the path of travel of said said can body in substantially tangential relation thereto, means for rotating said discs in unison and in time with the advancement of said can body, a segment shaped applicator member circumferentially disposed between said discs adjacent the outer peripheries thereof and slidably mounted in said discs for circumferential travel relative thereto, for carrying a free predetermined length of tape toward the path of travel of said can body for application to said advancing can body, and means for shifting said applicator member relative to said discs in accordance with the location of said advancing can body to effect application of said tape to said advancing body in a predetermined location thereon.

2. An apparatus of the character defined in claim 1 wherein said means for shifting said applicator member is a rack on said segment shaped member, a gear meshed with said rack and mounted on one of said discs, a cam arm connected to said gear, and a cam disposed adjacent said discs for rocking said arm and said gear in time with the rotation of said discs.

3. An apparatus of the character defined in claim 1 wherein said applicator segment is provided with vacuum ports, and wherein there is provided cooperating vacuum ports in one of said discs, and an adjacent valve having connection with a source of vacuum for vacuumizing said segment vacuum ports through rotation of said discs to hold said free length of tape onto said segment, said valve also having a connection with the outside atmosphere for breaking said vacuum to release said tape to said can body.

4. An apparatus of the character defined in claim 3 wherein there are a plurality of segregated groups of vacuum ports distributed along the length of said applicator segment for progressive vacuumization and devacuumization of said segment to effect holding and release of said tape progressively.

5. An apparatus for applying tape to the side seam of tubular can bodies, comprising a support for a plurality of can bodies arranged in end-to-end relation, means for advancing said can bodies along said support in spaced processional order with their side seams in longitudinal alignment, a rotatable applicator wheel disposed adjacent the path of travel of said can bodies, means for actuating said wheel in synchronism with the advancement of said can bodies along said support, a segment shaped applicator member slidably mounted in said wheel in substantially tangential relation to the path of travel of the side seams of said can bodies for circumferential travel relative to said wheel and for receiving and holding a terminal end portion of a substantially continuous tape, a tape cut-off blade mounted on said wheel in the path of travel of said segment member, a cooperating cut-off device disposed adjacent the rotary path of travel of said segment member with said wheel and on the opposite side of the tape on said segment member, and means connected with said segment members to shift said member and the tape received thereon into position adjacent the cut-off blade on said wheel for a tape severing operation to leave a free predetermined length of tape on said member, said means thereafter shifting said segment member away from said cut-off blade and around said wheel to compensate for the spaces between said can bodies on said support and to apply said tape in a predetermined location onto the side seam of a body on said support.

6. An apparatus of the character defined in claim 5 wherein there is provided a plurality of said segment members disposed in spaced relation around said wheel, and an equal number of said tape cut-off blades disposed one in each of the spaces between said segment members.

7. An apparatus for applying tape to the side seam of tubular can bodies, comprising means for advancing a can body along a path of travel, a wheel disposed adjacent said path of travel, means for rotating said wheel, segment shaped applicator members slidably mounted in said wheel for circumferential travel relative thereto, and means for shifting said applicator members relative to said wheel in accordance with the location of said advancing can body to effect application of said tape to said advancing body in a predetermined location thereon.

8. An apparatus for applying tape to the side seams of tubular can bodies, comprising means for advancing can bodies in spaced end-to-end relation along a predetermined path of travel with the side seams of the cans in longitudinal alignment, a rotatable wheel adjacent the path of travel of said side seams, a segment shaped applicator member slidably mounted in said wheel adjacent its outer periphery for circumferential travel relative thereto, means for rotating said wheel, and means for shifting said applicator member relative to said wheel in accordance with the location of a said advancing can body to compensate for the space between adjacent can bodies in the procession and to thereby effect application of said tape to a said advancing can body in a predetermined location thereon.

9. An apparatus for applying tape to predetermined areas of articles such as the side seams of can bodies, comprising means for advancing said articles along a predetermined path in spaced processional order with their said predetermined areas in longitudinal alignment, an applicator disposed adjacent the path of travel of said predetermined areas, said applicator having a plurality of applicator elements each adapted for receiving and carrying a free predetermined length of tape toward said path of travel for application by a said element to a said predetermined area of an advancing article, means for moving said applicator at substantially the velocity of said articles, and means for shifting said applicator elements successively in the direction of movement of said applicator a distance substantially equal to a said space between said predetermined areas in the time interval between receiving said tape on the element and initial application contact between said tape and a said advancing article to compensate for the space between predetermined areas on successive articles in the procession, and thereby effect application of said tape to a said advancing article in a predetermined location thereon while said element is moving at the same velocity as said applicator.

10. An apparatus for applying tape to the side seam of tubular can bodies, comprising means for advancing can bodies in predetermined spaced succession along a path of travel with their side seams in longitudinal alignment, an applicator disposed adjacent the path of travel of said side seams, said applicator comprising a plurality of applicator elements each adapted to receive and carry a length of said tape toward said path of travel and to apply it to a said advancing side seam, means for moving said applicator at substantially the same velocity as said can bodies, and means for positively shifting said applicator elements successively in the direction of motion of the remainder of said moving applicator in the time interval between receiving said tape on the element and initial application contact between said tape and a said side seam for spacing said lengths of tape on the applicator by at least the spacing between said can bodies preliminary to application of each tape length to a can body side seam, and then applying the tape while both the side seam and applicator element are advancing at the same velocity.

References Cited in the file of this patent

UNITED STATES PATENTS

| 2,289,336 | Bamford | July 14, 1942 |
| 2,795,263 | Honkanen | June 11, 1957 |

UNITED STATES PATENT OFFICE
CERTIFICATE OF CORRECTION

Patent No. 2,984,289  
May 16, 1961

Frank F. Borkmann

It is hereby certified that error appears in the above numbered patent requiring correction and that the said Letters Patent should read as corrected below.

In the grant, line 1, and in the heading to the printed specification, line 3, name of inventor, for "Frank R. Borkmann", each occurrence, read -- Frank F. Borkmann --; in the heading to the drawings, Sheets 1 to 4, line 1, for " F. R. Borkmann", each occurrence, read -- F. F. Borkmann --.

Signed and sealed this 10th day of October 1961.

(SEAL)  
Attest:

ERNEST W. SWIDER  
Attesting Officer

DAVID L. LADD  
Commissioner of Patents  
USCOMM-DC